US 12,115,970 B2

(12) United States Patent
Ademane et al.

(10) Patent No.: US 12,115,970 B2
(45) Date of Patent: Oct. 15, 2024

(54) POWERTRAIN CONTROLS FOR AN ELECTRIC MOTOR AND AN AUTOMATED MANUAL TRANSMISSION

(71) Applicant: Cummins Inc., Columbus, IN (US)

(72) Inventors: Harsha Ravindra Ademane, Indianapolis, IN (US); John P. Kresse, III, Martinsville, IN (US); Arun Prakash Thunga Gopal, Greenwood, IN (US); Kenneth M. Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 844 days.

(21) Appl. No.: 17/178,094

(22) Filed: Feb. 17, 2021

(65) Prior Publication Data
US 2021/0179070 A1    Jun. 17, 2021

Related U.S. Application Data

(63) Continuation of application No. PCT/US2019/064227, filed on Dec. 3, 2019.
(Continued)

(51) Int. Cl.
*B60W 20/30*    (2016.01)
*B60K 6/48*     (2007.10)
(Continued)

(52) U.S. Cl.
CPC ........... *B60W 20/30* (2013.01); *B60K 6/48* (2013.01); *B60W 10/08* (2013.01); *B60W 20/13* (2016.01); *B60K 2006/4825* (2013.01)

(58) Field of Classification Search
CPC ...... B60W 20/30; B60W 10/08; B60W 20/13; B60W 30/18118; B60W 2050/0006;
(Continued)

(56) References Cited

U.S. PATENT DOCUMENTS 5,993,350 A * 11/1999 Lawrie ............... B60W 10/10
                                                  903/945
6,035,735 A    3/2000 Graf et al.
(Continued)

FOREIGN PATENT DOCUMENTS

EP    2055557      5/2009
JP    20047972     1/2004
(Continued)

OTHER PUBLICATIONS

Search Report and Written Opinion, PCT Appln. No. PCT/US2019/064227, Feb. 20, 2020, 7 pgs.

*Primary Examiner* — Anne Marie Antonucci
*Assistant Examiner* — Connor L Knight
(74) *Attorney, Agent, or Firm* — Taft, Stettinius & Hollister LLP

(57) ABSTRACT

A vehicle system includes a powertrain including an electric motor operatively coupled with an automated manual transmission and an electronic control system including a gear shift control module, a transmission control module, and a motor control module in operative communication with one another over one or more controller area networks. The electronic control system includes supervisory controls configured to configured to arbitrate between a plurality of motor operation requests received over the one or more controller area networks to select a winning motor operation request, the plurality of motor operation requests including the operator torque request, evaluate one or more shift inhibit conditions, and command the electric motor to provide the winning motor operation request when none of the one or more shift inhibit conditions evaluate as true.

26 Claims, 5 Drawing Sheets

Related U.S. Application Data

(60) Provisional application No. 62/775,977, filed on Dec. 6, 2018.

(51) Int. Cl.
    *B60W 10/08*    (2006.01)
    *B60W 20/13*    (2016.01)

(58) Field of Classification Search
    CPC ..... B60W 2050/0091; B60W 2540/10; B60W 2510/244; B60W 2540/06; B60W 2540/16; B60W 2710/083; B60W 2710/1005; B60W 10/11; B60W 50/0097; B60W 30/18; B60K 6/48; B60K 2006/4825; B60K 6/46; B60L 2240/421; B60L 2240/423; B60L 2240/486; B60L 2250/24; B60L 2250/26; B60L 15/2054; Y02T 90/16; Y02T 10/40; Y02T 10/64; Y02T 10/72; Y02T 10/84; Y02T 10/62
    See application file for complete search history.

(56) References Cited

U.S. PATENT DOCUMENTS

| | | | |
|---|---|---|---|
| 6,145,398 A | 11/2000 | Bansbach et al. | |
| 6,629,026 B1 | 9/2003 | Baraszu et al. | |
| 6,883,394 B2 | 4/2005 | Koenig et al. | |
| 7,678,014 B2 | 3/2010 | Nohara et al. | |
| 7,957,873 B2 | 6/2011 | Cawthorne et al. | |
| 9,005,076 B2 | 4/2015 | Conlon et al. | |
| 9,297,455 B2 | 3/2016 | Li | |
| 9,714,705 B2 | 7/2017 | Andersson et al. | |
| 9,963,151 B2 | 5/2018 | Nilsson et al. | |
| 2005/0060080 A1* | 3/2005 | Phillips | B60W 20/11 701/54 |
| 2010/0145582 A1 | 6/2010 | Yamamoto et al. | |
| 2010/0286855 A1* | 11/2010 | Yang | B60W 10/06 180/65.265 |
| 2012/0021861 A1* | 1/2012 | Sakai | B60L 15/2054 903/910 |
| 2013/0079966 A1* | 3/2013 | Terakawa | B60W 10/02 180/65.265 |
| 2013/0310219 A1* | 11/2013 | Whitney | B60W 10/11 477/109 |
| 2014/0066251 A1* | 3/2014 | Kawamoto | B60W 10/11 180/65.265 |
| 2015/0197242 A1* | 7/2015 | Yamazaki | B60W 10/26 180/65.265 |
| 2015/0232096 A1* | 8/2015 | Ellis | B60W 50/082 701/1 |
| 2017/0082191 A1 | 3/2017 | Mullen et al. | |
| 2017/0130829 A1* | 5/2017 | Aselage | F16H 61/22 |
| 2017/0247027 A1* | 8/2017 | Nefcy | B60K 6/387 |
| 2017/0327105 A1 | 11/2017 | Shakiba-Herfeh et al. | |
| 2018/0274453 A1* | 9/2018 | Livshiz | F16H 63/502 |
| 2019/0193565 A1* | 6/2019 | Yuki | B60L 3/0007 |
| 2019/0367007 A1* | 12/2019 | Johri | B60W 30/18127 |

FOREIGN PATENT DOCUMENTS

| | | |
|---|---|---|
| JP | 2004138241 | 5/2004 |
| WO | 2017079423 | 5/2017 |
| WO | 2017177110 | 10/2017 |

\* cited by examiner

POWERTRAIN CONTROLS FOR AN ELECTRIC MOTOR AND AN AUTOMATED MANUAL TRANSMISSION

CROSS-REFERENCE

This application is a continuation of PCT Application No. PCT/US19/64227 filed Dec. 3, 2019, which claims the benefit of and priority to U.S. Application Ser. No. 62/775,977 filed Dec. 6, 2018, the disclosures of which are hereby incorporated by reference.

BACKGROUND

The present application relates generally to powertrain controls for an electric motor and an automated manual transmission ("AMT") and related apparatuses, methods, systems, and techniques. Current approaches to powertrain controls in such powertrains suffer from a number of shortcomings and unmet needs. There remains a substantial need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY

Example embodiments include unique apparatus, methods, systems and techniques for powertrain controls for powertrains including an electric motor and an AMT. Further embodiments, forms, objects, features, advantages, aspects, and benefits shall become apparent from the following description and drawings.

DETAILED DESCRIPTION

Figure 1:
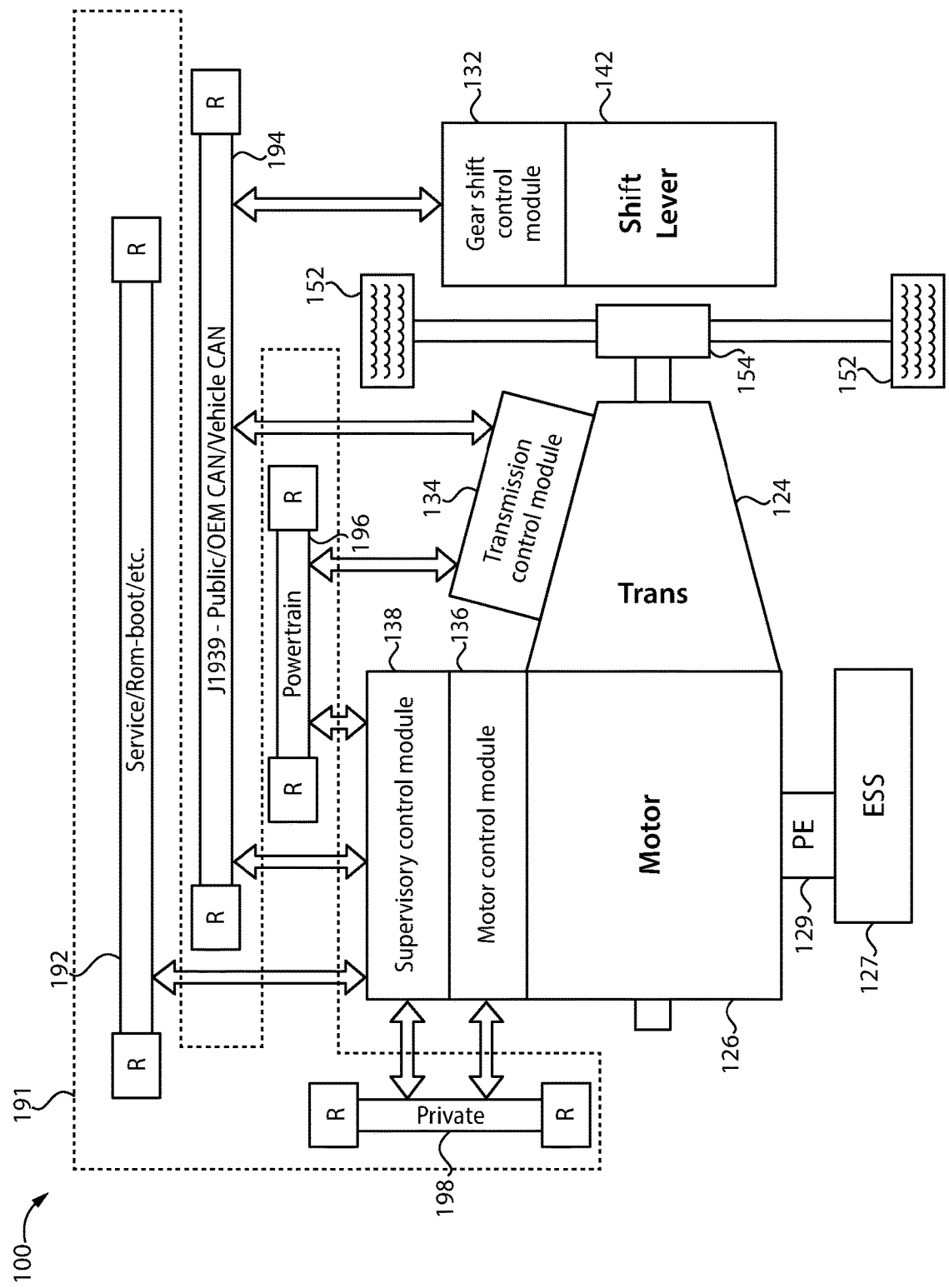
FIG. 1 is a schematic diagram illustrating certain aspects of an example vehicle system.

With reference to FIG. 1, there is illustrated a schematic view of an example vehicle system 100. In the illustrated embodiment, vehicle system 100 includes a powertrain comprising a transmission 124, an electric motor 126, an energy storage system ("ESS") 127, and power electronics 129. Electric motor 126 is operatively coupled with transmission 124 and with power electronics 129 which are, in turn, operatively coupled with ESS 127. Transmission 124 is operatively coupled with a differential 154 which, in turn, is operatively coupled with ground engaging members 152 (e.g., wheels) such that positive torque may be provided from motor 126 via transmission 124 to ground-contacting members 152 and negative torque may be provided from ground-contacting members 152 to motor 126 via transmission 124. The powertrain may also include additional components that are not illustrated such as an engine, one or more clutches, torque converters, or other powertrain components. Vehicle system 100 may be provided in a number of vehicles including, for example, a semi tractor-trailer, bus, delivery truck, service truck, construction machine, or off-road vehicle to name a few examples.

In the illustrated embodiment, the powertrain of vehicle system 100 is in the form of an electric vehicle in which motor 126 can provide torque for vehicle propulsion, ESS 127 is in the form of a high voltage battery, and power electronics 129 are in the form of a DC link and inverter operatively coupled with motor 126 and ESS 127. Electric motor 126 can be controlled to operate as a motor powered by energy from ESS 127 or as a generator providing power to ESS 127. When motor 126 is controlled to operate as a motor, the inverter of power electronics 129 is operated to convert DC power from ESS 127 to AC power to drive motor 126. When motor 126 is controlled to operate as a generator, it provides AC power to the inverter of power electronics 129 which is operated to convert the AC power to DC power to charge ESS 127. In other operating modes, motor 126 may be passive such that it is not providing positive or negative torque. In the depicted form, motor 126 has a common rotor and a common stator and provided as an integrated single unit. In other embodiments, a completely or partially separate motor, generator, rotor, stator, or the like may be integrated with engine 122 or transmission 124. Furthermore, it should be appreciated that in alternative embodiments some of the illustrated features may be absent and/or other optional devices and subsystems may be included (not shown).

In other embodiments, the powertrain of vehicle system 100 may include an internal combustion engine. In some forms, the powertrain may be configured as a fuel-cell electric vehicle system including a fuel cell system configured to supply power to ESS 127. In some forms, the powertrain may be configured as a range-extended electric vehicle system including an engine configured to drive a generator to provide electric power to motor 126. In some forms, the powertrain may be configured as a parallel hybrid powertrain system in which either or both of an engine and motor 126 can provide torque to a driveline for vehicle propulsion. In such embodiments, the engine may be provided as a four-stroke, compression ignition (CI) type with multiple cylinders and corresponding reciprocating pistons coupled to a crankshaft which is coupled to a flywheel that is coupled to a controllable clutch. In other embodiments, the engine may be of a different type, including different fueling, different operating cycle(s), different ignition, or the like. The engine may be provided with a number of related components which are not illustrated including an aftertreatment system, a mechanical accessory drive, an electrical accessory drive, and an air handling system, which may include one or more intake manifolds, exhaust manifolds, turbochargers, superchargers, air filters or other intake air and exhaust system components.

In the illustrated embodiment, ESS 127 is provided in the form of a high-voltage battery system. Other embodiments may include other types of battery systems or other power storage devices such as super-capacitors or ultra-capacitors. Furthermore, power electronics 129 are provided in a form comprising an AC/DC converter such as an inverter and a DC link which are configured to selectably convert DC power from ESS 127 to AC power to drive motor 126 and to convert AC power from motor 126 to DC power to change ESS 127.

Vehicle system 100 further includes an electronic control system (ECS) comprising a plurality of control modules including gear shift control module (GSCM) 132, transmission control module (TCM) 134, motor control module (MCM) 136, and supervisory control module (SCM). The ECS may also include additional control modules that are not illustrated such as an engine control module (ECM) or other control modules. It shall be appreciated that the GSCM 132, TCM 134, MCM 136, and SCM 138 and other control modules of the ECS may also be referred to as control units or controllers in some applications and may be provided in self-contained housings. The GSCM 132, TCM 134, MCM 136, and SCM 138 and other control modules of the ECS may be provided in the form of microprocessor-based or microcontroller-based circuitry which are configured to execute operating logic to perform the acts, methods, processes, and techniques disclosed herein as well as various control, management, and/or regulation functions. The operating logic may be provided in the form of program instructions stored in a non-transitory memory medium, dedicated hardware such as a hardwired state machine, analog calculating machines, or combinations thereof.

In the illustrated embodiment, GSCM 132, TCM 134, MCM 136, and SCM 138 are implemented in physically separate devices or units that are in operative communication with one another. In certain embodiments, the SCM 138 and the MCM 136 may be implemented in the same physical device. It shall be appreciated that the supervisory control disclosed herein may be provided and implemented as controls internal to the MCM 136 (for example, in embodiments where the SCM 138 and the MCM 136 are provided in the same physical device or unit), or in a physically separate device (for example, in embodiments where the SCM 138 and the MCM 136 are provided as a physically separate devices or units). The control modules of the ECS may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or electrical components.

The ECS of vehicle system 100 includes a vehicle controller area network ("CAN") 194 which may be an unrestricted or public J1939-based network of the type typically provided by a vehicle OEM as a part of the vehicle system 100. Vehicle CAN 194 provides operative communication between a plurality of controllers of vehicle system 100 including GSCM 132, TCM 134, and SCM 138. It shall be appreciated that vehicle CAN 194 may also provide operative communication between additional controllers of vehicle system 100.

The ECS of vehicle system 100 further includes a low voltage wiring harness 191 including a service CAN 192, a powertrain CAN 196 and a private CAN 198 which provide plurality of communication networks of the low-voltage wiring harness 191. Service CAN 192 provides operative communication with SCM 138 and an external service tool (not illustrated). Powertrain CAN 196 provides operative communication between TCM 134 and SCM 138. Private CAN 198 provides operative communication between SCM 138 and MCM 136. Service CAN 192, a powertrain CAN 196 and a private CAN 198 may be configured to operate under the J1939 protocol as well as various other communication protocols.

In the illustrated embodiment, transmission 124 is provided as an automated manual transmission ("AMT") which can operate in a drive mode and a manual mode. It shall be appreciated that AMT transmissions are distinct from automatic transmissions in that they include a gearbox and clutch more similar to a gearbox and clutch found in a manual transmission, but are also distinct from a manual transmission in that the clutch of an AMT is electronically controllable allowing automatic execution of gear shifts and eliminating the need for a clutch pedal. In the drive mode, the AMT undergoes shift events in an automated manner in response to acceleration commands from an accelerator pedal and/or cruise control system. In the manual mode, the AMT undergoes shift events in response to operator manipulation of or input to operator controls such as shift lever 142 which is operatively associated with GSCM 132. The illustrated components permit the ECS of vehicle system 100 to successfully complete a shift event by interfacing SCM 138 with TCM 134 and MCM 136 and facilitating communication between these components using J1939 CAN messages, it being appreciated that other embodiments may facilitate communication between these components using other messaging protocols. In order to complete a shift event, SCM 138 establishes supervisory control over electric motor power (torque and speed) whilst arbitrating between driver requests, transmission controller requests, operating conditions and other power-train control requests along with the present and estimated future operating conditions of the powertrain of the vehicle system 100.

The SCM 138 provides supervisory control over the operation of MCM 136 and motor 126 during a gear shift event. The supervisory control over the operation of MCM 136 may include the SCM 138 suspending a non-shifting response of the MCM 136 to an operator torque request such as a request generated in response to an accelerator pedal position or a cruise control setting. It shall be appreciated that the operator torque request and other types of torque requests described herein may include a requested motor torque and a requested motor speed. The normal or non-shifting response of the MCM 136 to an operator torque request may include the MCM 136 receiving the operator torque request and controlling the motor to operate to provide the torque indicated by the operator torque request. The normal or non-shifting response of the MCM 136 may be implemented in and provided by conventional control components residing in the MCM 136 and/or another control module that are responsive to operator torque requests received via one of the CAN networks of the vehicle system 100.

The supervisory control may further include the SCM 138 arbitrating between a plurality of motor operation requests received over the one or more controller area networks (including the operator torque request) to select a winning motor operation request. Each of the plurality of motor operation requests includes at least one parameter indicating a requested operation of the motor 126. The motor operation requests may be specified in terms of a number of operational parameters of the motor 126 including requests for motor torque, motor speed, motor power, motor current, motor voltage, or combinations thereof. In certain forms, one or more of the plurality of motor operation requests may include a requested motor torque. In certain forms, one or more of the plurality of motor operation requests may include a requested motor speed. In certain forms, one or more of the plurality of motor operation requests may include a requested motor torque and a requested motor speed. In certain forms, one or more of the plurality of motor operation requests may include a requested motor current. In certain forms, one or more of the plurality of motor operation requests may include a requested motor voltage. In certain forms, one or more of the plurality of motor operation requests may include a requested motor current and a requested motor voltage. The plurality of motor operation requests may include the operator torque request, other operator torque requests (if multiple operator torque requests are present, for example, if an accelerator pedal request is generated during cruise control operation), transmission torque requests from TCM 134, torque limits determined in response to present operating conditions of the motor 126 and/or ESS 127. and other power-train control requests along with the present and estimated future operating conditions of the power-train.

The SCM 138 may be configured to perform an arbitration by evaluating priority parameters associated with each of the plurality of torque requests according to priority logic. For example, the TCM 126 may be configured to provide a level 1 priority parameter (1-T) if the TCM 126 determines that its requested torque is necessary to avoid critical damage or failure of the transmission 124, to provide a level 2 priority parameter (2-T) if the TCM 126 determines that its requested torque is necessary to avoid undesirable operation of the transmission 124 which is likely to result in accelerated wear or degradation over time but which is not necessary to avoid the level 1 operating condition of the transmission 126, and to provide a level 3 priority parameter (3-T) if the TCM 126 determines that its requested torque is desirable but is not necessary to avoid the level 1 or level 2 operating conditions of the transmission 126. The MCM 136 may be configured to provide a level 1 priority parameter=1-M if the MCM 124 determines that its requested torque is necessary to avoid critical damage or failure of the motor 126 and/or ESS 127, to provide a level 2 priority parameter (2-M) if the MCM 136 determines that its requested torque is necessary to avoid undesirable operation of the motor 126 and/or ESS 127 which is likely to result in accelerated wear or degradation but is not necessary to avoid the level 1 operating conditions, and to provide a level 3 priority parameter (3-T) if the MCM 136 determines that its requested torque is desirable but not necessary to avoid the level 1 or level 2 operating conditions. The GSM 132 may be configured to provide a level 2 priority parameter (2-G) with its torque request.

The SCM 138 may be configured to perform a first selection which selects the highest level of priority parameters present and eliminates the lower level priority parameters from consideration. The SCM 138 may be further configured to perform a second selection from among multiple requests of the same priority level. For example, one of parameter 1-M or 1-T may be given first priority over all level 1 parameters 1-T and the other of parameter 1-M or 1-T may be given second priority over all other level 1 parameters. Alternatively, the SCM 138 may be configured to select an average or a weighted average of the torque request values associated with parameter 1-M and parameter 1-T or to select the lower magnitude of the two values. Similar prioritization may be performed for the other priority levels. The supervisory control may further include the SCM as 138 evaluating one or more shift inhibit conditions, and commanding the MCM 136 to control the motor to provide the winning motor operation request when none of the one or more shift inhibit conditions evaluate true.

The SCM may be also be configured to control the transition between the non-shifting response of MCM 136 and the suspension of the non-shifting response. For example, at the start of a shift event, SCM 138 may ramp down the torque of motor 126 to a lower value accommodating shifting from an existing operating torque. SCM 138 then arbitrates between various torque requests to select the winning motor operation request. Next, SCM 138 then controls the motor to match the torque/speed requested by the winning request. SCM 138 then ramps the motor torque back to the original operating or driver demand torque. During ramp-down, torque-speed control, and ramp-up, SCM 138 communicates the current operating mode to other controllers in the system via CAN/J1939. SCM 138 also monitors the system status to inhibit shift events. The shift event shall not occur until the supervisory control module clears the shift inhibit condition.

Figure 5:
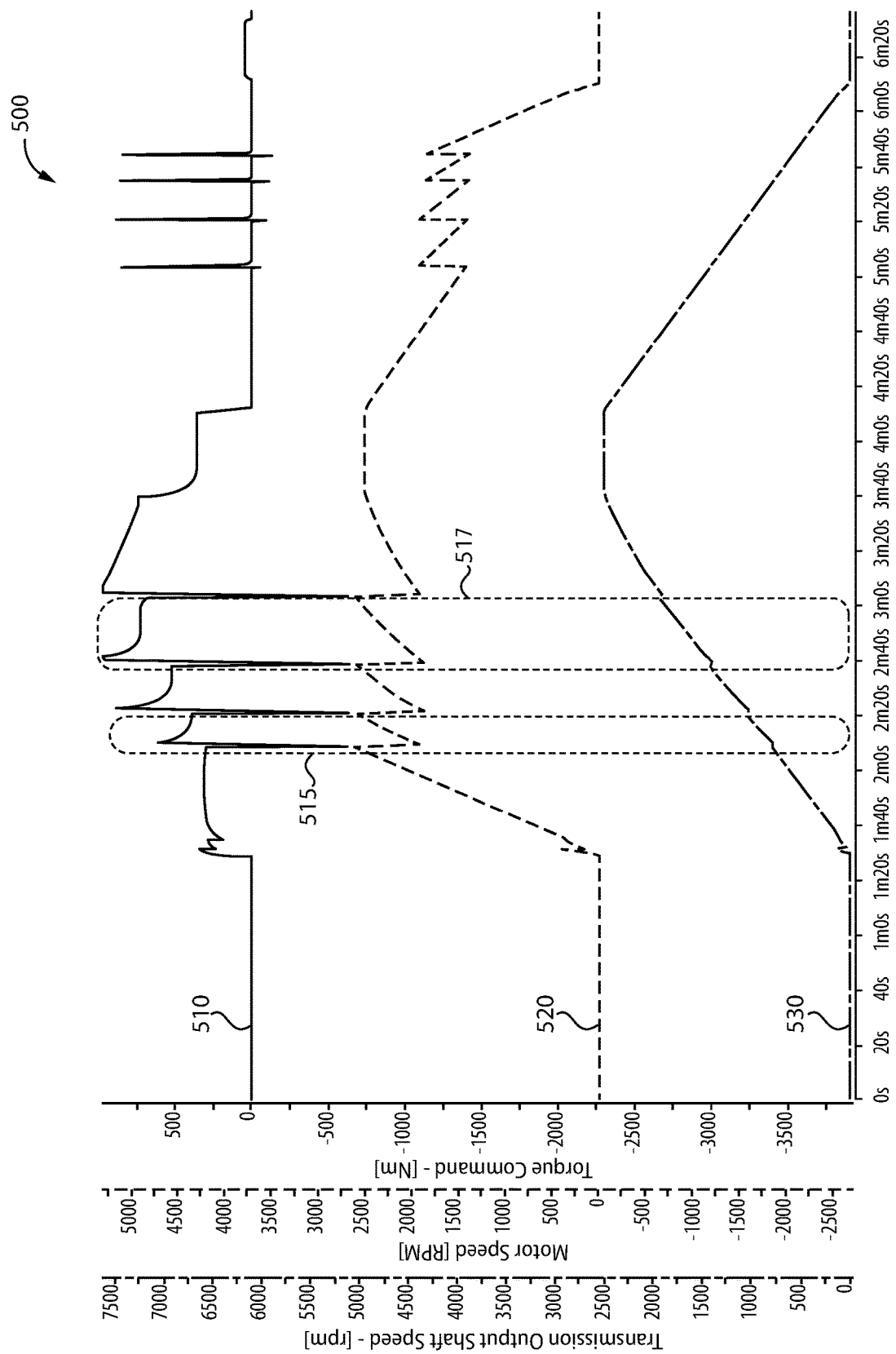
FIG. 5 is a graph illustrating variation in a torque command.

With reference to FIG. 5, there is illustrated a graph 500 depicting a plurality of curves 510, 520 and 530. Curve 510 illustrates the variation in magnitude of an electric motor torque command from SCM 138 as a function of time. Curve 520 illustrates the variation in the speed of electric motor 126 in response to variation in the electric motor torque command from SCM 138 as a function of time. Curve 530 indicates illustrates variation in the transmission output speed in response to variation in the speed of electric motor 126. Curves 510, 520 and 530 illustrate a plurality of shift events including shift events 515 and 517 as well as other shift events that are not labeled in the interest of preserving clarity. At the beginning of each shift event, the electric motor torque command from SCM 138 illustrated by curve 510 is ramped down rapidly to a negative or braking torque. In response, the speed of motor 126 ramped down to a value corresponding to a winning motor operation request as indicated by the triangular valleys of curve 520. At the end of each shift event, the electric motor torque command from SCM 138 illustrated by curve 510 is ramped up to a positive torque value which is effective to restore the pre-shift operation of motor 126 as indicated by curve 520. In the illustrated embodiment, the electric motor torque command from SCM 138 includes a speed command overshoot indicated by the maximum magnitude of curve 510 during a shift event followed by a restoration of the pre-shift command magnitude.

Figure 2:
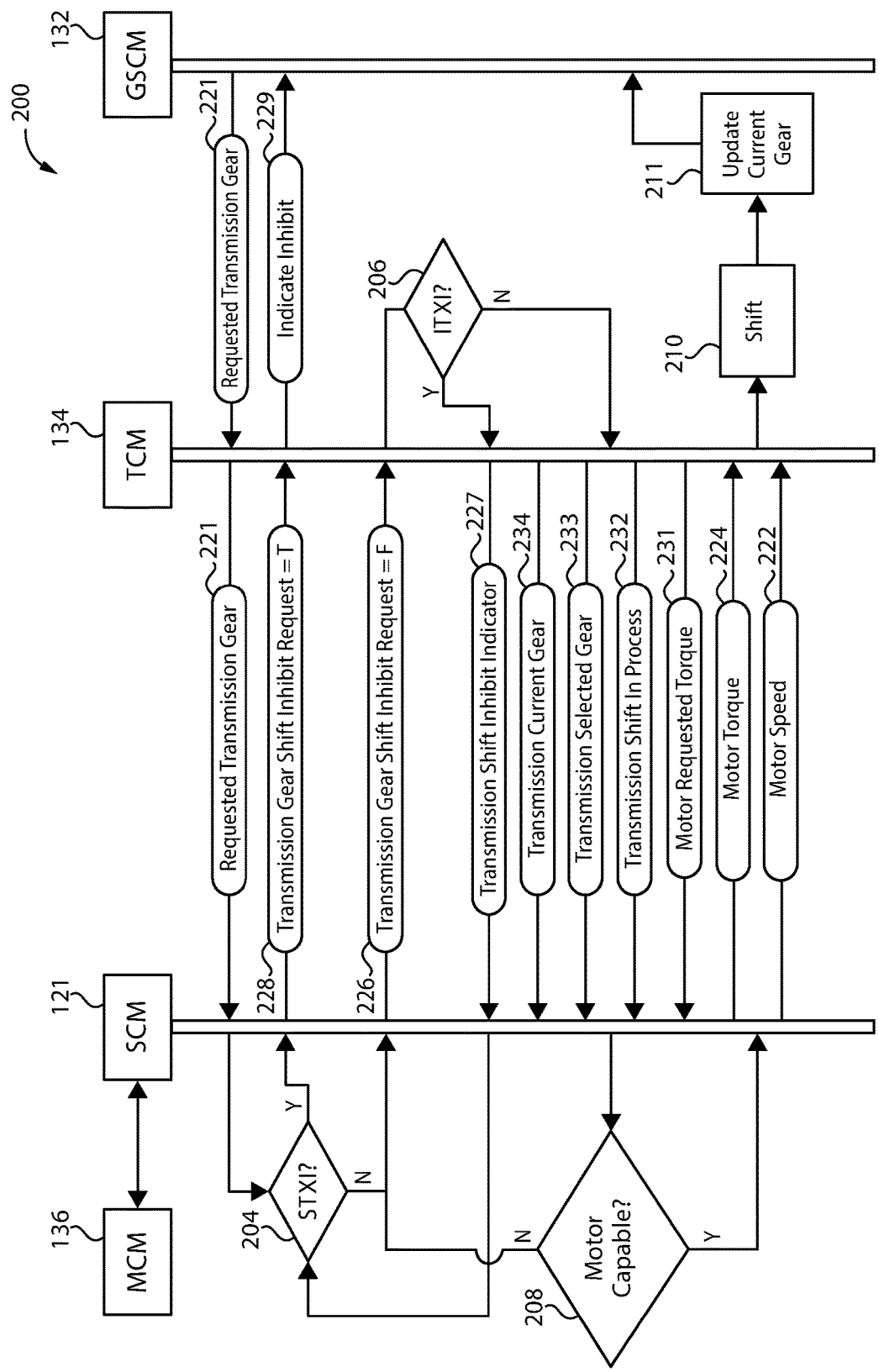
FIG. 2 is a schematic diagram illustrating certain aspects of an example shift event process.

With reference to FIG. 2, there is illustrated a schematic diagram depicting certain aspects of an example shift event process 200 which may be initiated by an operator command to a shift lever associated with a transmission. Shift event process 200 may be initiated when GSCM 132 generates a message 221 indicating a gear shift request (e.g., a requested transmission gear). The message 221 may be generated in response to an operator input to shift lever 142 or other vehicle controls. The message 221 is then transmitted to TCM 134 and SCM 138 over vehicle CAN 194.

Shift event process 200 next proceeds to conditional 204. At conditional 204, SCM 138 evaluates whether a supervisory transmission mode change inhibit condition (STXI) is true. The STXI may be, for example, a gear shift inhibit request which is generated based upon an evaluation performed by SCM 138. This evaluation may be based upon multiple criteria. For example, a mode change event may be inhibited if one or more of the following conditions is true: battery state of charge (SOC) is too low (e.g., below a threshold), battery contactors are open, the key switch is off, one or more system faults are active, the service brakes are not active and driver issues command to move out of park, the operator requests direction changes (e.g., forward gear to reverse or vice-versa) when vehicle is not stationary, or look-ahead information indicates that a gear shift should be inhibited.

If SCM 138 evaluates that a transmission shift inhibit request is true, it generates a message 228 indicating that mode changes are inhibited and transmits the message 228 to TCM 134 over a CAN network such as vehicle CAN 194 or powertrain CAN 196. It shall be appreciated that the system can be provided with communications controls that are calibratible to provide communication of the message over any or all of the CAN networks with which SCM 138 is in operative communication. This calibratible flexibility may be provided for all of the CAN-based communications described herein. In response to message 226, TCM 134 inhibits gear shifting and generates and transmits a message 229 to GSCM 132 via vehicle CAN 194 indicating that an operator perceptible indication that the gear shift is inhibited should be provided. In response to this message, the GSCM 132 provides an operator perceptible indication that the gear shift is inhibited, for example, providing an output on a display.

If SCM 138 evaluates that a transmission gear shift inhibit request is not true, it generates a message 226 indicating that gear shifts are not inhibited and transmits the message to TCM 134 over a CAN network such as vehicle CAN 194 or powertrain CAN 196. In response to message 226, at conditional 206, TCM 134 may also evaluate whether an internal transmission mode change inhibit condition (ITXI). The ITXI may be, for example, a gear shift inhibit request which is generated based upon an evaluation performed by TCM 134 of its own operating conditions indicating the state of the transmission with which it is operatively coupled. This evaluation may be based upon multiple criteria. For example, TCM 134 may inhibit shifting when it has already received or is already executing another a conflicting operation, or when it is experiencing an error condition.

If conditional 206 evaluates that the ITXI is true, TCM 134 generates a message 227 and transmits the message 227 over a CAN network such as vehicle CAN 194 or powertrain CAN 196. Message 227 indicates to SCM 138 that TCM 134 is self-inhibited from and SCM may respond to message 227 by returning to and repeating the evaluation of conditional 204 or by terminating the process 200 and awaiting receipt of a new message such as message 221.

If conditional 206 evaluates that the ITXI is false, TCM 134 generates messages 231, 231, 233 and 234, and transmits the messages 231, 231, 233 and 234 over a CAN network such as vehicle CAN 194 or powertrain CAN 196. In the illustrated embodiment, message 231 indicates a requested torque (or a requested torque and a requested and speed) of the motor for execution of the shift event, message 232 indicates whether a shift event is in progress, message 233 indicates a selected gear for the shift event (e.g., a gear to which the transmission intends to shift), and message 234 indicates the current gear of the transmission. In the illustrated embodiment, messages 231, 232, 233, and 234 are separate messages. In other embodiments, the information contained in any two or more, up to and including all of the messages 231, 232, 233, and 234 may be combined into a single message. In response, at conditional 208, SCM 138 evaluates whether the requested torque (or the requested torque and speed) of the motor for execution of the shift event can be provided. This evaluation may be performed by SCM 138 sending a message including a motor torque and speed request to MCM 136 and receiving from the MCM 136 a message indicating the motor torque and speed that can be provided in response to the request. In response to this message from the MCM 136, the SCM may evaluate with conditional 208 whether the motor torque and speed that can be provided are sufficiently close to the requested motor torque and speed (e.g., within a predetermined margin) to successfully execute a shift event.

At conditional 208, if SCM 138 evaluates that the requested torque and speed of the motor for execution of the shift event cannot be provided, it inhibits gear shifting and generates and transmits message 226 indicating that gear shifts are not inhibited and transmits the message to TCM 134 over a CAN network such as vehicle CAN 194 or powertrain CAN 196. In response to message 226, TCM 134 inhibits gear shifting and generates and transmits a message 229 to GSCM 132 via vehicle CAN 194 indicating that an operator perceptible indication that the gear shift is inhibited should be provided. In response to this message, the GSCM 132 provides an operator perceptible indication that the gear shift is inhibited, for example, providing an output on a display.

At conditional 208, if SCM 138 evaluates that the requested torque and speed of the motor for execution of the shift event can be provided, it generates and sends a message to MCM 136 to provide the commanded motor torque and speed. SCM 138 also generates a message 222 indicating a commanded motor speed and a message 224 indicating a commanded motor torque and transmits the message 222 and the message 224 to TCM 134 over a CAN network such as vehicle CAN 194 or powertrain CAN 196. In response to the message 222 and the message 224, TCM 134, at operation 210, executes a gear shift, updates the current gear, and generates and transmits a message 211 to GSCM 132 via vehicle CAN 194 indicating the updated current gear. In response to this message, the GSCM 132 provides an operator perceptible indication of the updated current gear.

It shall be appreciated that the operations illustrated and described in connection with FIG. 2 may provide a number of benefits for control over a vehicle system such as vehicle system 100. In certain forms, a direction of vehicle operation is determined by the foregoing acts of coordination among the supervisory control module, transmission control module, and gear shift control module. In certain forms, the powertrain (including the automated manual transmission) does not have a physical reverse gear and reverse operation of the vehicle system is provided by reverse rotation of the electric motor. In certain forms, the one or more acts of coordination include the supervisory control module comparing its internal vehicle direction state with an internal vehicle direction state of one or both of the one or both of the transmission control module and the gear shift control module and inhibiting vehicle operation if the compared vehicle direction states differ from one another. In certain forms, the supervisory control module and the transmission control module assume the same internal vehicle direction state once the vehicle system direction request from the driver has been accepted as a result of the operations illustrated and described in connection with FIG. 2. In certain forms, the supervisory control module is configured to spin the motor in the reverse direction once the vehicle system direction request has been accepted and a selected reverse gear has been engaged it being appreciated that the selected reverse gear may be a forward gear which is driven in reverse by the motor. In certain forms, the supervisory control module prevents erroneous vehicle operation in the direction not requested by a vehicle operator. In certain forms, the supervisory control module prevents erroneous vehicle operation by comparing its internal vehicle direction state with an internal vehicle direction state of the transmission control module. In certain forms, the supervisory control module prevents erroneous vehicle operation by comparing its internal vehicle direction state with an internal vehicle direction state of the gear shift control module. In certain forms, the supervisory control module is configured to transmit signals with the appropriate sign convention for forward, reverse, and neutral states. In certain forms the sign convention is applied to signals include for torque, speed and/or other rotational parameters. In certain forms, the supervisory control module is configured to move into the neutral state after a key on/off event. In certain forms, the supervisory control module is configured to maintain zero vehicle speed for a configurable period of time by providing torque commands to the motor while the vehicle system is positioned on a grade greater than a predetermined magnitude, for example, a grade of 2% or greater, a grade of 3% or greater, a grade of 4% or greater or another predetermined grade.

Figure 3:
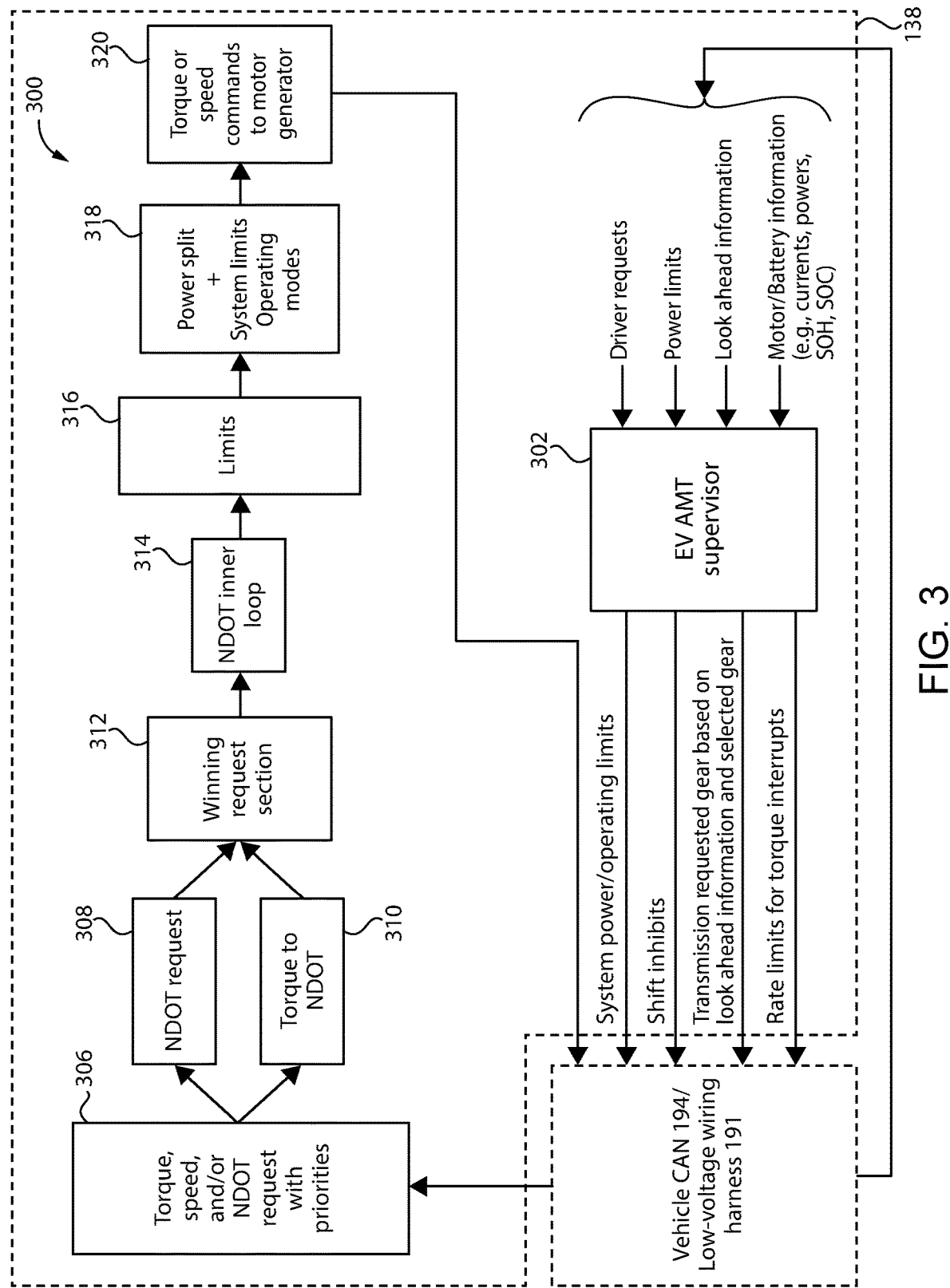
FIG. 3 is a schematic diagram illustrating certain aspects of example supervisory control logic.

With reference to FIG. 3, there is illustrated a schematic diagram illustrating certain aspects of example supervisory control logic 300 which may be implemented in and executed by the SCM 138. Supervisory control logic includes 300 includes EV AMT supervisor block 302 which receives a plurality of inputs via vehicle CAN 194 or a CAN network of the low voltage wiring harness 191 including, operator commands or driver request, power limits, look-ahead information, and motor information such as motor current, motor speed, motor power and motor temperature, and battery information such as battery current, battery power, battery state of charge, and battery state of health. EV AMT supervisor block 302 utilizes the received inputs to determine a plurality of outputs and transmits these outputs via vehicle CAN 194 or low voltage wiring harness 191 including system power limits or operating limits, a shift inhibit request, requested gear based on look-ahead information and the currently selected gear, and rate limits for torque interrupts.

EV AMT supervisor block 302 may determine the system power limits or operating limits based upon one or more motor limits such as a motor current limit, a motor speed limit, a motor power limit, and/or a motor temperature limit. EV AMT supervisor block 302 may determine the system power limits or operating limits based upon one or more battery limits such as a battery current limit, a battery power limit, a battery state of charge limit, and a battery state of health limit. EV AMT supervisor block 302 may determine the shift inhibit request based upon an evaluation of a supervisory transmission mode change inhibit condition (STXI) as described above in connection with process 200. EV AMT supervisor block 302 may determine the requested gear based on look-ahead information and the currently selected gear by evaluating a predicted vehicle load based in part upon a future road grade, determining a desired gear based upon the predicted vehicle load and the current engine speed and current engine load, and determining a requested gear shift based upon the desired gear and the current gear. EV AMT supervisor block 302 may determine the rate limits for torque interrupts based upon operational limits of the motor and/or the battery which may include predetermined limits and which may be based upon the present operational state of the motor and/or the battery.

The supervisory control logic includes 300 includes torque and acceleration request block 306 which receives one or more motor torque, speed (N) or acceleration (NDOT) requests and associated priorities from TCM 134 via vehicle CAN 194 or low voltage wiring harness 191. Torque and acceleration request block 306 outputs a set of one or more acceleration (NDOT) requests 308 and a set of corresponding torque requests 310 based on the inputs that it receives and provides these outputs to arbitration block 312 which selects winning torque and NDOT request from the inputs that it receives. Arbitration block 312 may select winning torque and NDOT requests in accordance with the techniques described hereinabove in connection with SCM 138. Arbitration block 312 provides the selected winning request to NDOT inner loop controller 314 which determines motor torque and speed or acceleration values based on the inputs that it receives. These motor torque and speed or acceleration values are provided to limiter block 316 which imposes limits on the motor torque and speed or acceleration values. The limited motor torque and speed or acceleration values are provided to power split and system limits block 318 which uses power split logic, system limits logic, and operating modes logic to determine torque and speed commands 320 for motor 126 which are provided to MCM 136 via low voltage wiring harness 191.

Figure 4:
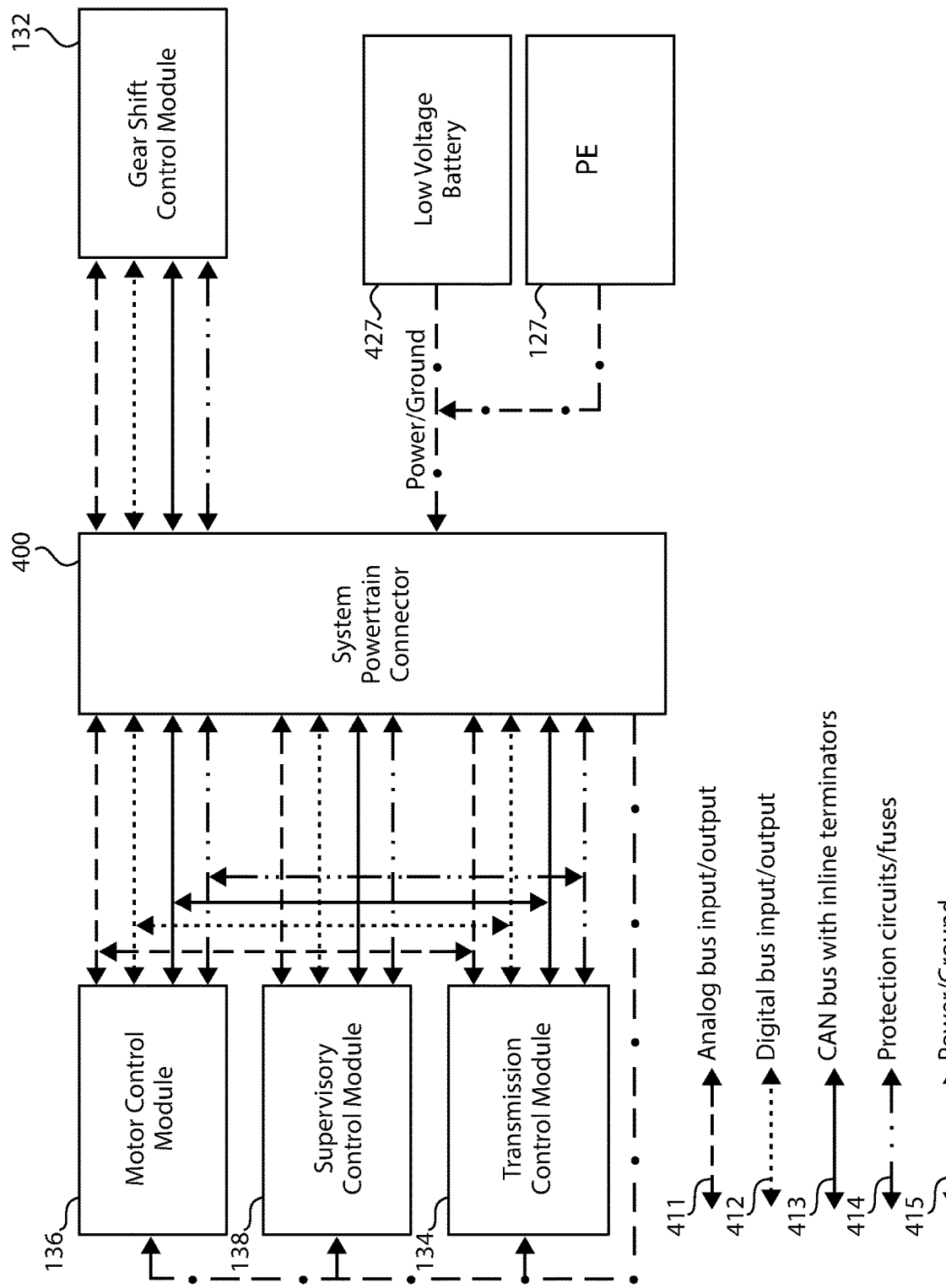
FIG. 4 is a schematic diagram illustrating certain aspects of an example low voltage wiring harness.

With reference to FIG. 4, there is illustrated a schematic diagram depicting certain aspects of low voltage wiring harness 191. In FIG. 4 lines 411 indicate analog bus inputs/outputs, lines 412 indicate digital bus inputs/outputs, lines 413 indicate CAN busses with inline terminations, lines 414 indicate protective circuits or fuses, and lines 415 indicate grounded power connections. FIG. 4 further illustrates a low voltage battery 427 which is connected to system powertrain connector 400 by one of lines 415 in addition to the power provided by ESS 127.

A first example embodiment is a vehicle system comprising: a powertrain including an electric motor operatively coupled with an automated manual transmission; and an electronic control system including a gear shift control module, a transmission control module, and a motor control module operative communication with one another over one or more controller area networks; wherein the electronic control system includes supervisory controls configured to: arbitrate between a plurality of motor operation requests received over the one or more controller area networks to select a winning motor operation request, the plurality of motor operation requests including an operator torque request, evaluate one or more shift inhibit conditions, and command the electric motor to provide the winning motor operation request when none of the one or more shift inhibit conditions evaluate as true.

In a second form of the first example embodiment, the supervisory controls are configured to command the electric motor to provide the winning motor operation request by ramping up or down from current motor torque, speed, and power values to new motor torque, speed and torque values corresponding to the winning motor operation request.

In a third form of the first example embodiment, the supervisory controls are configured to (a) in response to a gear shift request, suspend a non-shifting response of the motor control module to an operator torque request, and (b) terminate the suspension of the non-shifting response of the motor control module in response to the completion of a gear shift.

In a fourth form of the first example embodiment, the one or more inhibit conditions comprise one or more of: a battery state of charge (SOC) being below an SOC limit, a battery contactor being open, a key switch being off, one or more system power limits being below a system power limit, a battery charging system being connected, one or more system faults being active, service brakes being inactive and an operator command to drive being true, an operator requested vehicle direction changes while the vehicle system is not stationary, and look-ahead information indicating that a gear shift should be inhibited.

In a fifth form of the first example embodiment, at least one of the one or more controller area networks is provided by a low voltage wiring harness.

In a sixth form of the first example embodiment, the one or more controller area networks include a vehicle controller area network, a powertrain controller area network, a service controller area network, and a private controller area network.

In a seventh form of the first example embodiment, at least one of the one or more controller area networks is provided by a low voltage wiring harness.

In an eighth form of the first example embodiment, the supervisory controls are implemented in the motor control module.

In a ninth form of the first example embodiment, one of (a) the powertrain includes one of an engine and a fuel cell, (b) the powertrain is configured as a range-extended electric drive system including an engine configured to drive a generator to provide electrical power to the motor, and (c) the powertrain is configured as a parallel hybrid drive system wherein either or both of an engine and the electric motor are operable to provide torque to propel the vehicle system.

In a tenth form of the first example embodiment, the supervisory controls are provided in a supervisory control module, the supervisory control module and the motor control module being physically separate devices.

In an eleventh form of any of the first example embodiment or the second through tenth forms of the first example embodiment, the powertrain does not have a physical reverse gear, and reverse operation of the vehicle system is provided by reverse rotation of the electric motor.

In a twelfth form of any of the first example embodiment or the second through tenth forms of the first example embodiment, a direction of vehicle operation is determined by one or more acts of coordination among the supervisory controls, the transmission control module, and the gear shift control module. In a refinement, the one or more acts of coordination include the supervisory controls comparing a first vehicle direction state internal to the supervisory controls with a second internal vehicle direction state of one of the transmission control module and the gear shift control module.

In a thirteenth form of any of the first example embodiment or the second through tenth forms of the first example embodiment, the supervisory controls and the transmission control module assume the same internal vehicle direction state once the vehicle system direction request from the driver has been accepted by the system.

In a fourteenth form of any of the first example embodiment or the second through tenth forms of the first example embodiment, the supervisory controls are configured to spin the motor in a reverse direction once the vehicle system direction request has been accepted and the selected reverse gear has been engaged.

In a fifteenth form of the first example embodiment or the second through tenth forms of the first example embodiment, the supervisory controls prevent erroneous vehicle operation in the direction not requested by a vehicle operator.

In a sixteenth form of any of the first example embodiment or the second through tenth forms of the first example embodiment, the supervisory controls prevent erroneous vehicle operation by comparing a first internal vehicle direction state with a second internal vehicle direction state of the transmission control module.

In a seventeenth form of any of the first example embodiment or the second through tenth forms of the first example embodiment, the supervisory controls are configured to transmit signals for at least one of torque, speed, and other rotational engine parameters with a sign convention indicating one of a forward state, a reverse state, and a neutral state.

In an eighteenth form of any of the first example embodiment or the second through tenth forms of the first example embodiment, the supervisory controls are configured to at least one of initialize into a neutral state after a key-on event, and move into a neutral state after a key-off event and prior to completing a system power down.

In a nineteenth form of any of the first example embodiment or the second through tenth forms of the first example embodiment, the supervisory controls are configured to maintain zero vehicle speed for a configurable period of time by providing torque commands to the motor while the vehicle system is positioned on a grade greater than a predetermined magnitude.

In a twentieth form of any of the first example embodiment or the second through tenth forms of the first example embodiment, the gear shift control module is configured to generate a message indicating a requested transmission mode in response to an operator command and to transmit the message to the transmission control module and the supervisory controls via the one or more controller area networks.

In a refinement of the twentieth form, the supervisory controls evaluate whether a transmission mode change inhibit request is true and, if the transmission shift inhibit request is true, generate a message indicating that transmission mode changes are inhibited and transmit the message to the transmission control module via the one or more controller area networks.

In a refinement of the twentieth form, the supervisory controls evaluate whether a transmission mode change inhibit request is true and, if the transmission mode change inhibit request is not true, the supervisory controls generate a message indicating that gear shifts are not inhibited and transmits the message to the transmission control module over via the one or more controller area networks and, in response to the message the transmission control module evaluates whether an internal shift inhibit condition is true. In another refinement, the supervisor control module receives via the or more controller area networks one or more signals indicating the current gear of the transmission, the selected gear for the shift event, an indication whether a shift event is in progress, and a requested torque and speed of the motor for execution of the shift event and, in response, the supervisory controls evaluate whether the requested torque and speed of the motor for execution of the shift event can be provided. In another refinement, one of (a) if the supervisory controls evaluate that the requested torque and speed of the motor for execution of the shift event cannot be provided, the supervisory controls inhibit gear shifting and generates and transmit a message to the gear shift control module via the one or more controller area networks indicating that an operator perceptible indication that the gear shift is inhibited should be provided, and (b) if the supervisory controls evaluate that the requested torque and speed of the motor for execution of the shift event can be provided, the supervisory controls generate and send a message to the motor control module to provide the commanded motor torque and speed, and generate and send a message to the transmission control module indicating the commanded motor torque and speed.

A second example embodiment is a method of controlling the operation of a vehicle powertrain, the method comprising: operating an electronic control system to control an electric motor of the vehicle system powertrain to provide torque to an automated manual transmission, the electronic control system including a gear shift control module, a transmission control module, and a motor control module in operative communication with one or more controller area networks, the electronic control system including supervisory controls implemented in one or both of the motor control module and a supervisory control module in operative communication with the one or more controller area networks; operating the supervisory controls to arbitrate between a plurality of motor operation requests received over the one or more controller area networks to select a winning motor operation request, the plurality of motor operation requests including an operator torque request, operating the supervisory controls to evaluate one or more shift inhibit conditions, and operating the supervisory controls to command the electric motor to provide the winning motor operation request when none of the one or more shift inhibit conditions evaluate as true.

A second form of the second example embodiment comprises: operating the supervisory controls to command the electric motor to provide the winning motor operation request by ramping up or down from current motor torque, speed, and power values to new motor torque, speed and torque values corresponding to the winning motor operation request.

A third form of the second example embodiment comprises: operating the supervisory controls to (a) suspend a non-shifting response of the motor control module to an operator torque request in response to a gear shift request, and (b) terminate the suspension of the non-shifting response of the motor control module in response to the completion of a gear shift.

In a fourth form of the second example embodiment, the one or more inhibit conditions comprise one or more of: a battery state of charge (SOC) being below an SOC limit, a battery contactor being open, a key switch being off, one or more system power limits being below a system power limit, a battery charging system being connected, one or more system faults being active, service brakes being inactive and an operator command to drive being true, an operator requested vehicle direction changes while the vehicle system is not stationary, and look-ahead information indicating that a gear shift should be inhibited.

In a fifth form of the second example embodiment, at least one of the one or more controller area networks is provided by a low voltage wiring harness.

In a sixth form of the second example embodiment, the one or more controller area networks include a vehicle controller area network, a powertrain controller area network, a service controller area network, and a private controller area network.

In a seventh form of the second example embodiment, at least one of the one or more controller area networks is provided by a low voltage wiring harness.

In an eighth form of the second example embodiment, the supervisory controls are implemented in the motor control module.

In a ninth form of the second example embodiment, one of (a) the powertrain includes one of an engine and a fuel cell, (b) the powertrain is configured as a range-extended electric drive system wherein an engine is configured to drive a generator to provide electrical power to the motor, and (c) the powertrain is configured as a parallel hybrid drive system wherein either or both of an engine and the electric motor are operable to provide torque to propel the vehicle system.

In a tenth form of the second example embodiment, the motor control module and the supervisory control module are provided in physically separate devices and the supervisory controls are implemented in the supervisory control module.

In an eleventh form of the second example embodiment or any of the second through tenth forms of the second example embodiment, the powertrain does not have a physical reverse gear, and reverse operation of the vehicle system is provided by reverse rotation of the electric motor.

In a twelfth form of the second example embodiment or any of the second through tenth forms of the second example embodiment, a direction of vehicle operation is determined by one or more acts of coordination among the supervisory controls, transmission control module, and gear shift control module coordinate. In a refinement, the one or more acts of coordination include the supervisory controls comparing a first vehicle direction state internal to the supervisory controls with a second vehicle direction state internal to one or both of the transmission control module and the gear shift control module.

In a thirteenth form of the second example embodiment or any of the second through tenth forms of the second example embodiment, the supervisory controls and the transmission control module assume the same internal vehicle direction state once the vehicle system direction request from the driver has been accepted by the system.

In a fourteenth form of the second example embodiment or any of the second through tenth forms of the second example embodiment, the supervisory controls spin the motor in the reverse direction once the vehicle system direction request has been accepted and the selected reverse gear has been engaged.

In a fifteenth form of the second example embodiment or any of the second through tenth forms of the second example embodiment, the supervisory controls prevent erroneous vehicle operation in the direction not requested by a vehicle operator.

In a sixteenth form of the second example embodiment or any of the second through tenth forms of the second example embodiment, the supervisory controls prevent erroneous vehicle operation by comparing its internal vehicle direction state with an internal vehicle direction state of the transmission control module.

In a seventeenth form of the second example embodiment or any of the second through tenth forms of the second example embodiment, the supervisory controls transmit signals for one or more of torque and speed with a sign convention indicating one of a forward state, a reverse state, and a neutral state.

In a eighteenth form of the second example embodiment or any of the second through tenth forms of the second example embodiment, the supervisory controls at least one of initialize into a neutral state after a key-on event, and move into a neutral state after a key-off event and prior to completing a system power down.

In a nineteenth form of the second example embodiment or any of the second through tenth forms of the second example embodiment, the supervisory controls maintain zero vehicle speed for a configurable period of time by providing torque commands to the motor while the vehicle system is positioned on a grade greater than a predetermined magnitude.

In a twentieth form of the second example embodiment or any of the second through tenth forms of the second example embodiment, the gear shift control generates a message indicating a requested transmission mode in response to an operator command and to transmits the message to the transmission control module and the supervisory controls via the one or more controller area networks.

In a refinement of the twentieth form, the supervisory controls evaluate whether a transmission shift inhibit request is true and one of (a) if the shift inhibit request is true, generate a message indicating that shifting is inhibited and transmit the message to the transmission control module via the one or more controller area networks, and (b) if shift inhibit request is not true, generate a message indicating that gear shifts are not inhibited and transmit the message to the transmission control module via the one or more controller area networks, wherein, in response to the message, the transmission control module evaluates whether an internal shift inhibit condition is true. In another, the supervisor control module receives via the or more controller area networks one or more signals indicating the current gear of the transmission, the selected gear for the shift event, an indication whether a shift event is in progress, and a requested torque and speed of the motor for execution of the shift event and, in response, the supervisory controls evaluate whether the requested torque and speed of the motor for execution of the shift event can be provided. In another refinement, if the supervisory controls evaluate that the requested torque and speed of the motor for execution of the shift event cannot be provided, the supervisory controls inhibits gear shifting and generates and transmits a message to the gear shift control module via the one or more controller area networks indicating that an operator perceptible indication that the gear shift is inhibited should be provided. In another refinement, if the supervisory controls evaluate that the requested torque and speed of the motor for execution of the shift event can be provided, supervisory controls generate and sends a message to the motor control module to provide the commanded motor torque and speed, and generates and sends a message to the transmission control module indicating the commanded motor torque and speed.

While illustrative embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A vehicle system comprising:
 a powertrain including an electric motor operatively coupled with an automated manual transmission; and
 an electronic control system including a gear shift control module, a transmission control module, and a motor control module in operative communication with one another over one or more controller area networks;
 wherein the electronic control system includes supervisory controls configured to:
 arbitrate between a plurality of motor operation requests received over the one or more controller area networks to select a winning motor operation request, each of the plurality of motor operation requests including a parameter indicating a requested operation of the motor and a priority parameter, the supervisory controls arbitrating between the plurality of motor operation requests by evaluating the priority parameter, the plurality of motor operation requests including an operator torque request,
 evaluate one or more shift inhibit conditions, and
 command the electric motor to provide the winning motor operation request when none of the one or more shift inhibit conditions evaluate as true.

2. The vehicle system of claim 1, wherein the supervisory controls are configured to command the electric motor to provide the winning motor operation request by ramping up or down from current motor torque, speed, and power values to new motor torque, speed and torque values corresponding to the winning motor operation request.

3. The vehicle system of claim 1, wherein the supervisory controls are configured to (a) in response to a gear shift request, suspend a non-shifting response of the motor control module to the operator torque request, and (b) terminate the suspension of the non-shifting response of the motor control module in response to the completion of a gear shift.

4. The vehicle system of claim 1, wherein the one or more inhibit conditions comprise one or more of:
 a battery state of charge (SOC) being below an SOC limit,
 a battery contactor being open,
 a key switch being off,
 one or more system power limits being below a system power limit,
 a battery charging system being connected,
 one or more system faults being active,
 service brakes being inactive and an operator command to drive being true,
 an operator requested vehicle direction changes while the vehicle system is not stationary, and
 look-ahead information indicating that a gear shift should be inhibited.

5. The vehicle system of claim 1, wherein at least one of the one or more controller area networks is provided by a low voltage wiring harness.

6. The vehicle system of claim 1, wherein the one or more controller area networks include a vehicle controller area network, a powertrain controller area network, a service controller area network, and a private controller area network.

7. The vehicle system of claim 6, wherein at least one of the one or more controller area networks is provided by a low voltage wiring harness.

8. The vehicle system of claim 1, wherein the supervisory controls are implemented in the motor control module.

9. The vehicle system of claim 1, wherein at least one of (a) the powertrain includes one of an engine and a fuel cell, (b) the powertrain is configured as a range-extended electric drive system including an engine configured to drive a generator to provide electrical power to the motor, and (c) the powertrain is configured as a parallel hybrid drive system wherein either or both of an engine and the electric motor are operable to provide torque to propel the vehicle system.

10. The vehicle system of claim 1, wherein the supervisory controls are provided in a supervisory control module, the supervisory control module and the motor control module being physically separate devices.

11. The vehicle system of claim 1, wherein at least one of:
the powertrain does not have a physical reverse gear, and reverse operation of the vehicle system is provided by reverse rotation of the electric motor;
a direction of vehicle operation is determined by one or more acts of coordination among the supervisory controls, the transmission control module, and the gear shift control module;
a direction of vehicle operation is determined by one or more acts of coordination among the supervisory controls, the transmission control module, and the gear shift control module and the one or more acts of coordination include the supervisory controls comparing a first vehicle direction state internal to the supervisory controls with a second internal vehicle direction state of one of the transmission control module and the gear shift control module;
the supervisory controls and the transmission control module assume the same internal vehicle direction state once the vehicle system direction request from the driver has been accepted by the system;
the supervisory controls are configured to spin the motor in a reverse direction once the vehicle system direction request has been accepted and the selected reverse gear has been engaged;
the supervisory controls prevent erroneous vehicle operation in the direction not requested by a vehicle operator;
the supervisory controls prevent erroneous vehicle operation by comparing a first internal vehicle direction state with a second internal vehicle direction state of the transmission control module;
the supervisory controls are configured to transmit signals for at least one of torque, speed, and other rotational engine parameters with a sign convention indicating one of a forward state, a reverse state, and a neutral state;
the supervisory controls are configured to at least one of initialize into a neutral state after a key-on event, and move into a neutral state after a key-off event and prior to completing a system power down; and
the supervisory controls are configured to maintain zero vehicle speed for a configurable period of time by providing torque commands to the motor while the vehicle system is positioned on a grade greater than a predetermined magnitude.

12. The vehicle system of claim 1, wherein the gear shift control module is configured to generate a message indicating a requested transmission mode in response to an operator command and to transmit the message to the transmission control module and the supervisory controls via the one or more controller area networks.

13. The vehicle system of claim 12, wherein the supervisory controls evaluate whether a transmission mode change inhibit request is true and, if the transmission mode change inhibit request is true, generate a message indicating that transmission mode changes are inhibited and transmit the message to the transmission control module via the one or more controller area networks.

14. The vehicle system of claim 12, wherein the supervisory controls evaluate whether a transmission mode change inhibit request is true and, if the transmission mode change inhibit request is not true, the supervisory controls generate a message indicating that gear shifts are not inhibited and transmits the message to the transmission control module via the one or more controller area networks and, in response to the message the transmission control module evaluates whether an internal shift inhibit condition is true.

15. The vehicle system of claim 12, wherein the supervisor control module receives via the or more controller area networks one or more signals indicating the current gear of the transmission, a selected gear for a shift event, an indication whether the shift event is in progress, and a requested torque and speed of the motor for execution of the shift event and, in response, the supervisory controls evaluate whether the requested torque and speed of the motor for execution of the shift event can be provided.

16. The vehicle system of claim 15, wherein at least one of (a) if the supervisory controls evaluate that the requested torque and speed of the motor for execution of the shift event cannot be provided, the supervisory controls inhibit gear shifting and generates and transmit a message to the gear shift control module via the one or more controller area networks indicating that an operator perceptible indication that the gear shift is inhibited should be provided, and (b) if the supervisory controls evaluate that the requested torque and speed of the motor for execution of the shift event can be provided, the supervisory controls generate and send a message to the motor control module to provide the commanded motor torque and speed, and generate and send a message to the transmission control module indicating the commanded motor torque and speed.

17. A method of controlling the operation of a vehicle powertrain, the method comprising:
operating an electronic control system to control an electric motor of the vehicle system powertrain to provide torque to an automated manual transmission, the electronic control system including a gear shift control module, a transmission control module, and a motor control module in operative communication with one or more controller area networks, the electronic control system including supervisory controls implemented in one or both of the motor control module and a supervisory control module in operative communication with the one or more controller area networks;
operating the supervisory controls to arbitrate between a plurality of motor operation requests received over the one or more controller area networks to select a winning motor operation request, each of the plurality of motor operation requests including a parameter indicating a requested operation of the motor and a priority parameter, the supervisory controls arbitrating between the plurality of motor operation requests by evaluating the priority parameter, the plurality of motor operation requests including an operator torque request,
operating the supervisory controls to evaluate one or more shift inhibit conditions, and
operating the supervisory controls to command the electric motor to provide the winning motor operation request when none of the one or more shift inhibit conditions evaluate as true.

18. The method of claim 17, comprising: operating the supervisory controls to command the electric motor to provide the winning motor operation request by ramping up or down from current motor torque, speed, and power values to new motor torque, speed and torque values corresponding to the winning motor operation request.

19. The method of claim 17, comprising operating the supervisory controls to (a) suspend a non-shifting response of the motor control module to the operator torque request in response to a gear shift request, and (b) terminate the suspension of the non-shifting response of the motor control module in response to the completion of a gear shift.

20. The method of claim 17, wherein the one or more inhibit conditions comprise one or more of:
 a battery state of charge (SOC) being below an SOC limit,
 a battery contactor being open,
 a key switch being off,
 one or more system power limits being below a system power limit,
 a battery charging system being connected,
 one or more system faults being active,
 service brakes being inactive and an operator command to drive being true,
 an operator requested vehicle direction changes while the vehicle system is not stationary, and
 look-ahead information indicating that a gear shift should be inhibited.

21. The method of claim 17, wherein at least one of the one or more controller area networks is provided by a low voltage wiring harness.

22. The method of claim 17, wherein the one or more controller area networks include a vehicle controller area network, a powertrain controller area network, a service controller area network, and a private controller area network.

23. The method of claim 22, wherein at least one of the one or more controller area networks is provided by a low voltage wiring harness.

24. The method of claim 17, wherein the supervisory controls are implemented in the motor control module.

25. The method of claim 24, wherein at least one of (a) the powertrain includes one of an engine and a fuel cell, (b) the powertrain is configured as a range-extended electric drive system wherein an engine is configured to drive a generator to provide electrical power to the motor, and (c) the powertrain is configured as a parallel hybrid drive system wherein either or both of an engine and the electric motor are operable to provide torque to propel the vehicle system.

26. The method of claim 24, wherein the motor control module and the supervisory control module are provided in physically separate devices and the supervisory controls are implemented in the supervisory control module.

* * * * *